(12) United States Patent
Hombu (10) Patent No.: US 6,736,032 B2
(45) Date of Patent: *May 18, 2004

(54) WIRE STRIPPER

(75) Inventor: Kousuke Hombu, Hachioji (JP)

(73) Assignee: Komax Holding AG (CH)

( * ) Notice: Subject to any disclaimer, the term of this patent is extended or adjusted under 35 U.S.C. 154(b) by 77 days.

This patent is subject to a terminal disclaimer.

(21) Appl. No.: 09/972,209

(22) Filed: Oct. 5, 2001

(65) Prior Publication Data

US 2002/0029663 A1 Mar. 14, 2002

Related U.S. Application Data

(63) Continuation of application No. 09/233,626, filed on Jan. 19, 1999, now Pat. No. 6,508,148.

(30) Foreign Application Priority Data

Jan. 16, 1998 (JP) ........................................ H 10-006931

(51) Int. Cl.[7] ................................................. H02G 1/12
(52) U.S. Cl. .......................................... 81/9.44; 81/9.51
(58) Field of Search ........................... 81/9.4, 9.44, 9.51

(56) References Cited

U.S. PATENT DOCUMENTS

| 4,745,828 A | 5/1988 | Stepan |
| 5,582,078 A | 12/1996 | Talley |
| 5,787,768 A | 8/1998 | Talley |

FOREIGN PATENT DOCUMENTS

EP 352 038 1/1990

*Primary Examiner*—James G. Smith
(74) *Attorney, Agent, or Firm*—Ostrolenk, Faber, Gerb & Soffen, LLP (57) ABSTRACT

A wire stripper capable of automatically grasping a coated wire, cutting the coating with cutters, rotating the cutters and stripping the cut coating away with only one electric motor. The wire stripper is provided with a reversible main spindle which is supported on a machine frame and allowed to slide crosswise so as to enable gripping operation of the grippers as well as nipping and cutting operation of the cutters. The main spindle is provided with a lead-screw shaft with which a nut block is coupled so that the lead-screw shaft advances by forward rotation of the main spindle to close the grippers and the cutters as well as to rotate the cutters. The nut block is then moved backward by the lead screw of the lead-screw shaft after the main spindle has stopped advancing and the cutters are then withdrawn to strip the cut coating away from the core.

7 Claims, 9 Drawing Sheets

WIRE STRIPPER

This application is a Continuation of U.S. patent application Ser. No. 09/233,626, filed Jan. 19, 1999 now U.S. Pat. No. 6,508,148.

BACKGROUND OF THE INVENTION

1. Field of the Invention

This invention concerns a wire stripper for automatically stripping the coating off the end of a coated wire in a required length.

2. Discussion of the Prior Art

Various wire strippers have been made available which serve for stripping the coating off the end of a coated wire and exposing the core in a required length.

With such conventional wire strippers, in general, a coated wire is inserted into a machine and gripped at the end from both sides by grippers, and is nipped at the same time by cutters from both sides where its coating is to be cut. The cutters cut only the coating and strip the coating away from the wire end while being withdrawn.

Cutters and grippers of such conventional wire strippers are opened and closed by reciprocating motion of a cutter/gripper operating element by means of an pneumatic cylinder (or hydraulic cylinder) or through operation of cutter/gripper operating cams by means of an electric motor.

To mention some of the problems concerning conventional wire strippers, the pneumatic or hydraulic cylinder necessitates a compressor or a hydraulic unit, respectively, in addition to the wire stripper, which remarkably restricts the place where such wire stripper can be used in combination with such equipment. Furthermore, the compressor causes high exhaustion noise and may adversely affect the mechanism due to moisture contained in the air.

The variation using cams requires large decelerator and large components including a coupling because an electric motor has to be used separately for each motion, or motor rotation has to be transmitted to the cam only after substantial deceleration, which results in large and expensive wire strippers.

SUMMARY OF THE INVENTION

The present invention has the object of providing a remarkably small, quiet and inexpensive wire stripper without restrictions about location of use because gripping of wire and stripping of coating can be performed by means of a conventional reversible motor. A main spindle is supported on machine frame, being allowed to slide longitudinally, and is reversible in rotation by means of only one motor and is provided with a lead-screw shaft coupled with a nut block. The lead-screw shaft moves forward to the nut block by forward rotation of the main spindle to close the grippers and the cutters and at the same time to rotate the cutters. The nut block moves backward to retract the cutters after the main spindle has stopped to advance.

The invention aims at providing an inexpensive compact wire stripper capable of automatically grasping a coated wire, cutting the coating with cutters, rotating the cutters and stripping the cut coating away by means of only one electric motor. This is accomplished in the present invention as follows: A wire stripper according to the invention is provided with a reversible main spindle which is supported on machine frame and allowed to slide crosswise so as to enable gripping operation of the grippers as well as nipping and cutting operation of the cutters. The main spindle is provided with lead-screwed shaft with which a nut block is coupled so that the lead-screwed shaft advances by forward rotation of the main spindle to close the grippers and the cutters as well as to rotate the cutters. The nut block is then moved backward by the lead screw of the lead-screwed shaft after the main spindle has stopped to advance and the cutters are then withdrawn to strip the cut coating away from the core.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
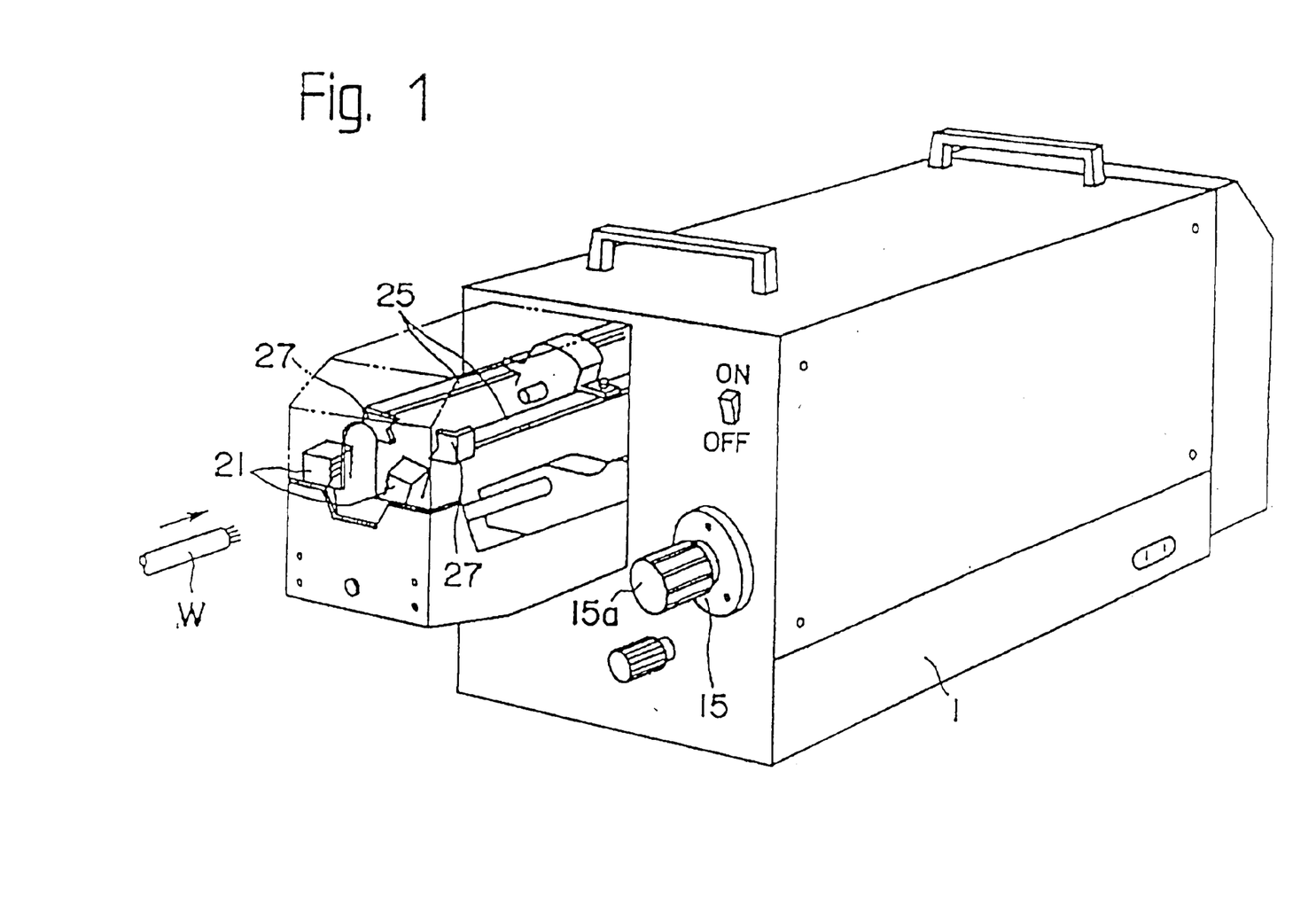
FIG. 1: is a perspective view of a working form of wire stripper according to the invention.
Figure 2:
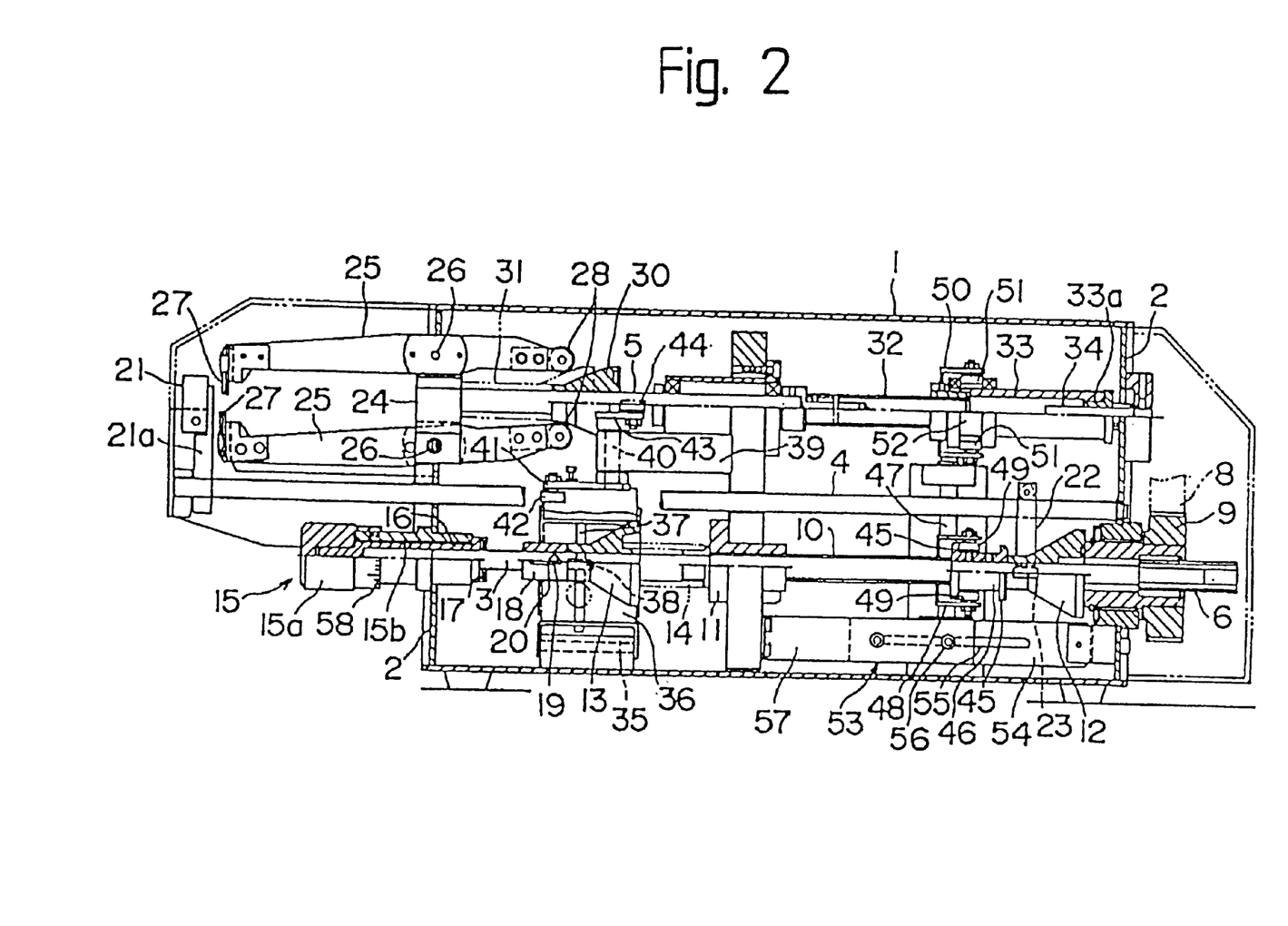
FIG. 2: is a longitudinal section A—A of FIG. 3.
Figure 3:
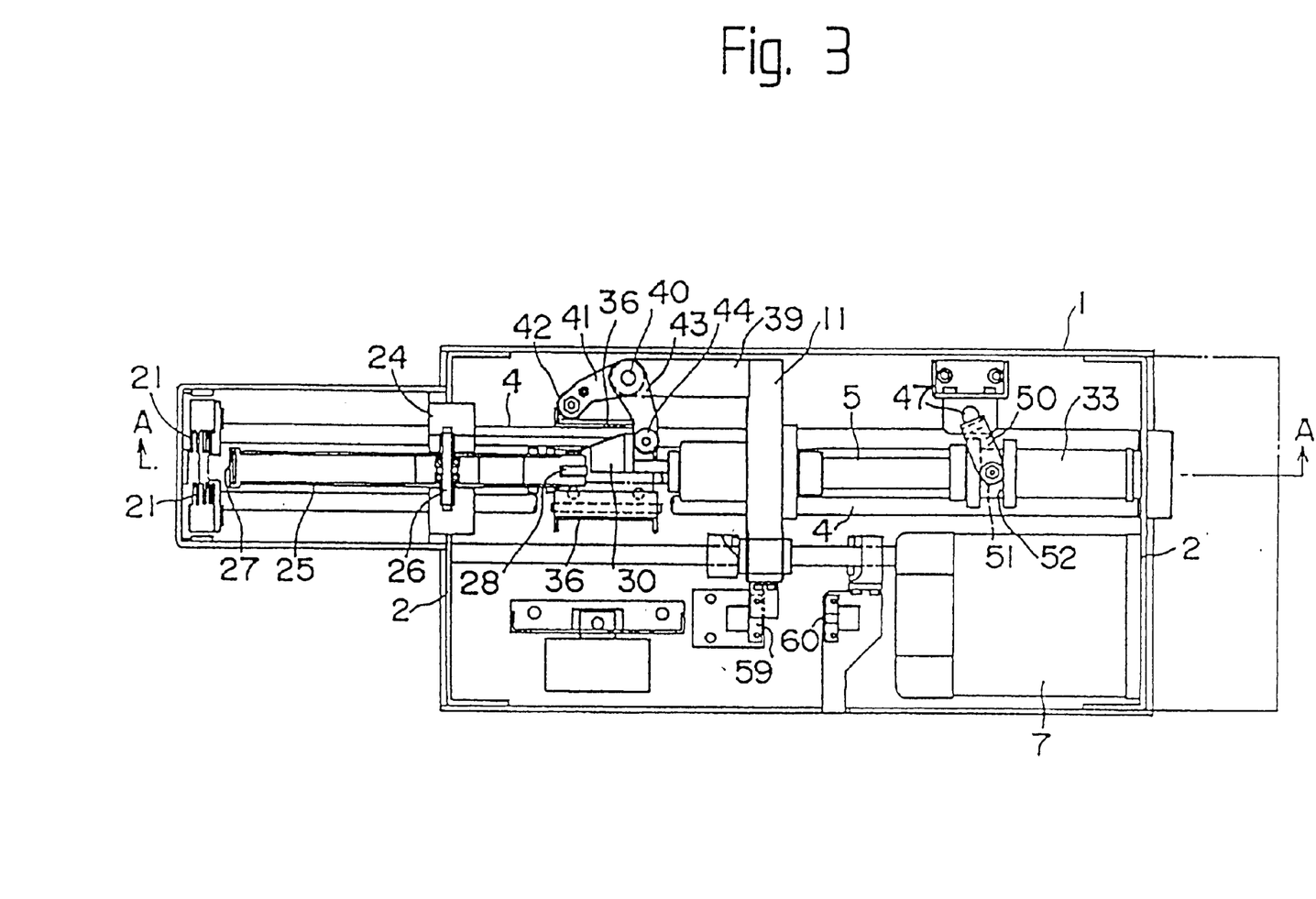
FIG. 3: is a horizontal section of FIG. 1.
Figure 4:
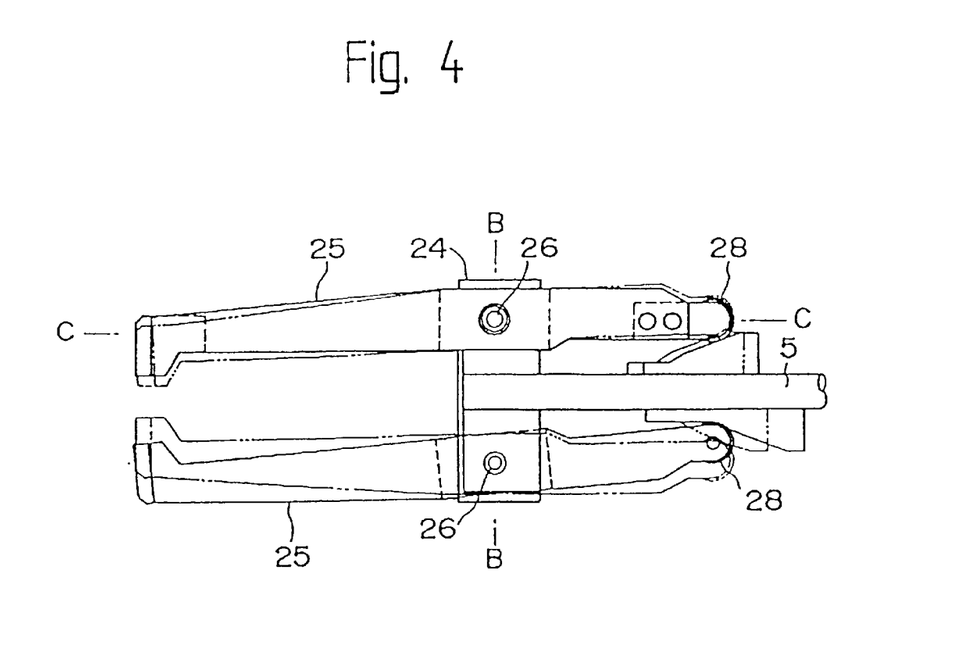
FIG. 4: is a sketch showing cutter arm operation.
Figure 5:
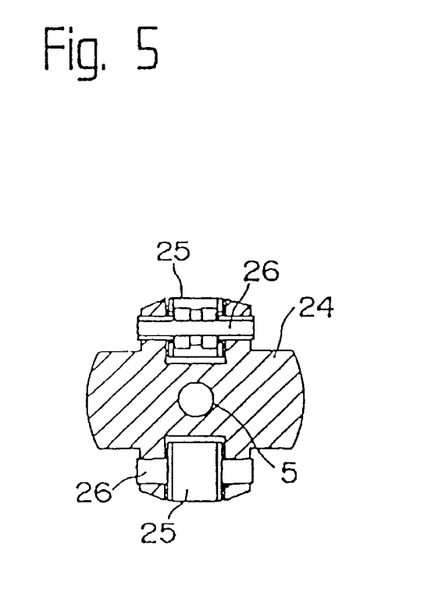
FIG. 5: is a section B—B according to FIG. 4.

FIG. 1 shows the appearance of a working form of a wire stripper according to the invention. FIGS. 2 and 2A show its longitudinal section (corresponding to section A—A of FIG. 3) and FIG. 3 shows its horizontal section. In the description below, the left side in FIGS. 1 through 3 where wire comes in is referred to as "front side" and the right side as "rear side".

As shown in FIG. 2, a main spindle 3 is supported in a lower position between side walls 2 at the front end and the rear end in the longitudinal direction of machine frame 1, so that the spindle 3 can rotate and at the same time slide axially. Two gripper shafts 4 are provided over the main spindle 3 parallel to each other. A cutter shaft 5 is located above and between the gripper shafts 4.

The rear end of the main spindle 3 is formed as a spline shaft 6 (or key) with a required length. A toothed pulley 9 is fitted on the spline shaft 6 to receive rotation via a timing belt 8 from a conventional reversible motor 7 (FIG. 3) such as an induction motor (single phase), a cooled reversible motor, etc. mounted on the machine frame 1 so as to transmit rotation of the motor 7 to the main spindle 3.

The intermediate portion of the main spindle 3 is formed as a lead-screwed shaft 10, on which a nut block 11 is fitted to move forward or backward axially in accordance with the rotating direction of the main spindle 3.

A first cam 12 tapering off to the front side is fixed co-axially to the main spindle 3 between the spline shaft and the lead-screwed shaft 10. A second cam 13 tapering off to the front side is fitted in front of the nut block 11 and allowed to slide. A compression spring 14 in the form of a coil is inserted between the thicker end of second conical cam 13 and the nut block 11. The lead-screwed shaft 10 and the nut block 11 may be of ball screw specification.

At the front end of the main spindle 3 protruding from the side wall 2 of the machine frame 1, a positioning element 16 is fitted to move forward and backward by screw-through rotation of a knob 15a of an infeed adjusting mechanism 15 for adjustment of infeed to the coating of wire W. A thrust bearing 17 is provided on the inner end of the positioning element 16 to bring it into contact with the front end of the second conical cam 13.

A cylindrical part 18 on the tip of the second conical cam 13 is provided with an axial slot 19, into which a pin 20, fixed to the main spindle 3, is fitted so that advance of the main spindle 3 is allowed by the length of the slot 19 after the front end of the second conical cam 13 has come in contact with the thrust bearing 17 at the inner end of the positioning element 16.

A base 21a of grippers 21, 21 is fixed to the front end of the gripper shafts 4, respectively, while the upper ends of arms 22, are fixed and suspended near the rear ends of the gripper shafts 4, respectively. Cam rollers 23, are attached to the lower end of arms 22 so that they can rotate on a horizontal plane. The cam rollers 23 are kept in contact with the peripheral face of the first conical cam 12 and pushed by its conical periphery when it moves forward to rotate the gripper shafts 4 in opposite directions to each other. The grippers 21, close (wire gripped) when the first conical cam 12 moves forward, while they are opened in case of backward movement.

The front end of the cutter shaft 5 is located on the side wall 2 at the front end of machine frame 1. A holder 24 fixed to the front end of the cutter shaft 5 bears cutter arms 25, symmetrically about the axis of the cutter arm 25 by means of shafts 26, located a little behind the middle points of the cutter arms 25. The cutter arms 25, are provided at the front end with cutters 27 that face each other and with cam rollers 28 at the rear end.

A third conical cam 30 is sliding-fitted to the cutter shaft 5. A compression spring 31 is inserted between the cam 30 and the holder 24.

A spline shaft 32 (or key) is fitted on the rear end of the cutter shaft 5, to which a sliding cylinder 33 is sliding-fitted. A female-screw part 33a at the rear end of the sliding cylinder 33 is connected to a lead-screw part 34 fixed to the side wall 2.

Figure 2B:
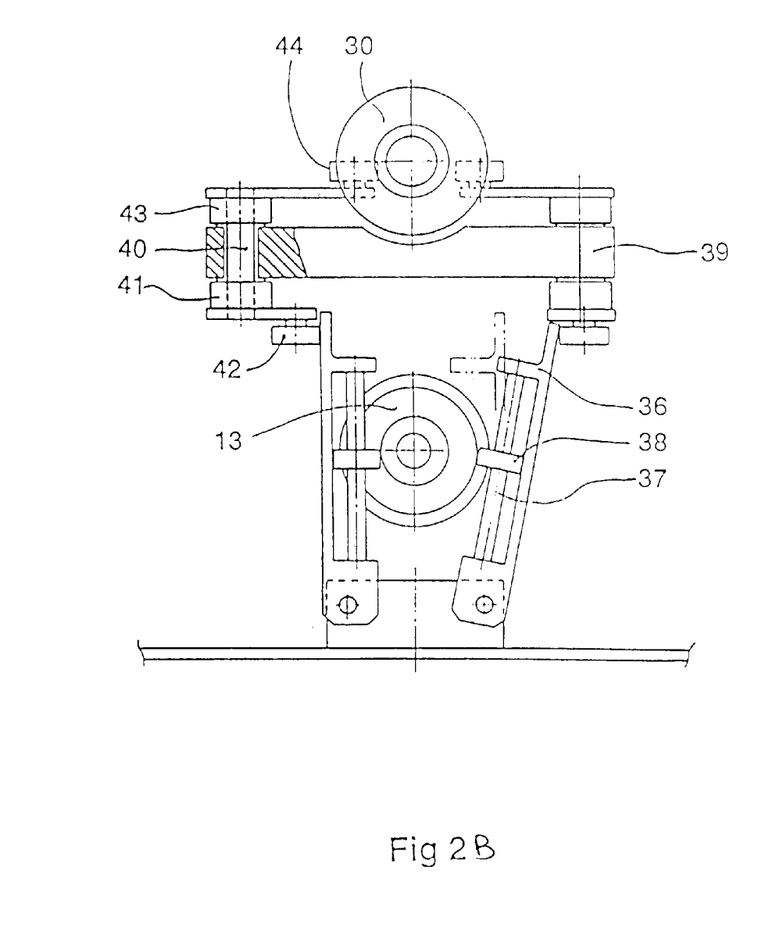
FIG. 2B is a view B in FIG. 2A.

The second conical cam 13 is provided with oscillating members 36 (only one of them shown in FIG. 2) on both sides which are supported on the machine frame 1 in erected position by a spring on the lower end so that they can oscillate on the shafts 35. A cam roller 38 on a vertical shaft 37 of the oscillating member 36 is designed to come in contact with the peripheral face of the second conical cam 13 (See FIG. 2B).

On the other hand, a shaft 40 vertical to a supporting member 39 substantially integrated to the nut block 11 is supported so that it can rotate freely. A roller 42 on the tip of the lever 41, whose base end is fixed to the lower end of the shaft 40, is in contact with the outer face of the oscillating member 36 at a point near the upper end. A roller 44 on the tip of a lever 43, whose base end is fixed to the upper end of the shaft 40, is in contact with the rear end of the third conical cam 30. The roller 42 of the lever 41 is always kept in contact with the oscillating member 36 by the action of the compression spring 31. When the second conical cam 13 moves forward, the oscillating member 36 is pushed outward so that the roller 44 of the lever 43 moves the third conical cam 30 forward against the action of the compression spring 31.

A cylindrical member 46 having flanges 45, on its front and rear ends is provided at the front end of the first conical cam 12. Rollers 49, on the tip of a lower lever 48, which is reverse-C-shaped if seen from the lateral side and fixed to a shaft 47 supported on the machine frame 1 and allowed to rotate, are put between the flanges 45, of the cylindrical member 46 with axial play. Rollers 51 on the tip of an upper lever 50, which is reverse-C-shaped if seen from the lateral side and fixed to the upper part of the shaft 47, are fitted into a peripheral groove 52 formed on the sliding cylinder 33 in peripheral direction. When the rollers 49 of the lower lever 48 are pushed by the rear flange 45 of the cylindrical member 46, the upper lever 50 oscillates to move the sliding cylinder 33 forward via its rollers 51, which in turn is connected with the lead-screw part 34 to transmit rotation to the cutter shaft 5 through the spline shaft 32 to complete an interlocking mechanism.

A brake unit 53 is provided between the nut block 11 and the rear side wall 2 of the machine frame 1 to decelerate return (backward movement) of the nut block 11. The brake unit 53 is coupled with a plate 57 on the nut block side by means of a shaft 56 inserted into a horizontal slot 55 of a base 54 fixed to the side wall 2 and exerts braking action by friction due to the force of a spring, not shown in the figure, via the shaft 56. Resistance to return of the nut block 11 is converted into gripping force of the grippers 21 which grip the wire strongly.

The timing of movement of the first and second conical cams 12, 13 is designed so that the main spindle 3 advances by lead screw on its lead-screw shaft 10 while the nut block is kept fixed during forward rotation of main spindle 3. The first conical cam 12 closes the cutters 27, the second conical cam 13 moves forward to close the grippers 21, and the nut block 11 moves backward against the resistance of the brake unit 53 by reaction force caused when the second conical cam 13 stops. This resistance is converted into a force to close the grippers 21, strongly and then the cutters 27 move backward as a result of retraction of the nut block 11 to strip the coating away from core.

Figure 6:
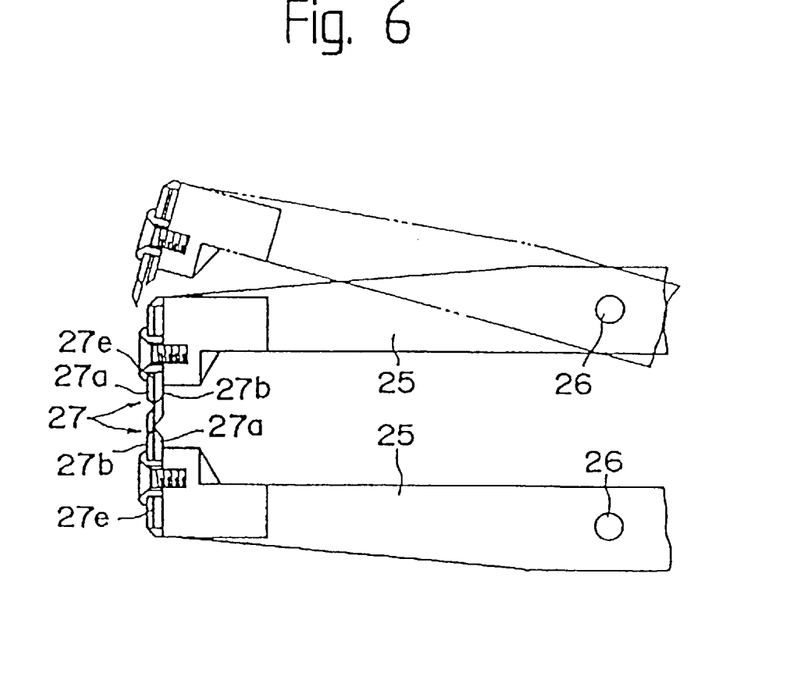
FIG. 6: is a partial view of the cutter according to FIG. 4.
Figure 7A:
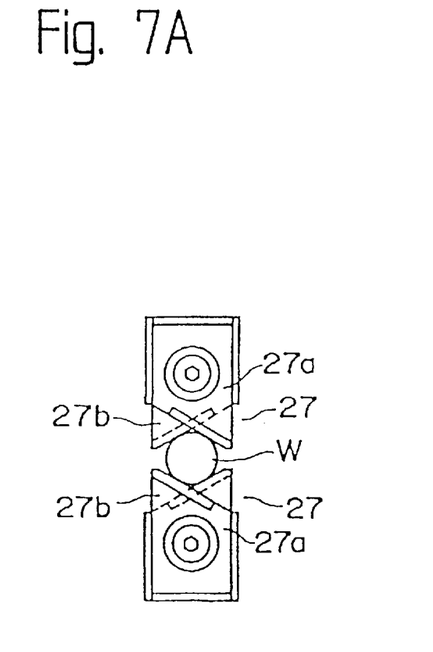
FIGS. 7A and 7B: are explanatory sketches of cutter function.
Figure 7B:
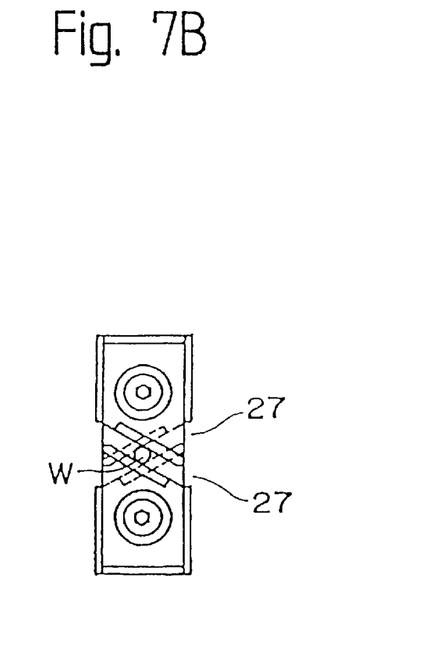
Figure 8A:
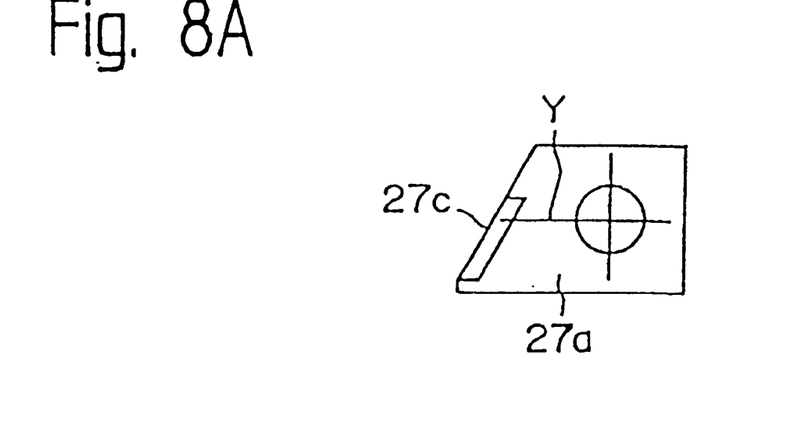
FIGS. 8A and 8C: are disassembly sketches of the cutter structure.
Figure 8B:
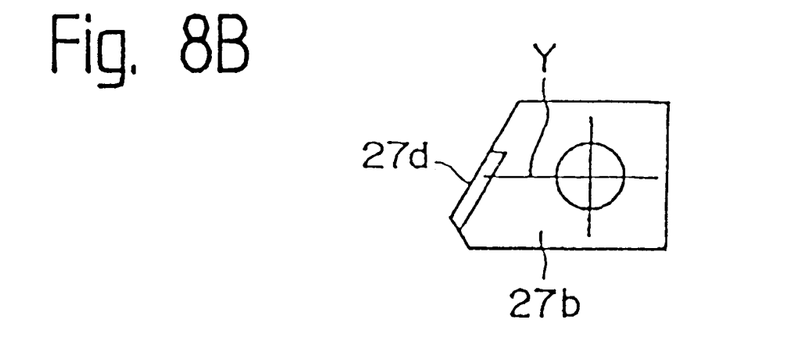
Figure 8C:
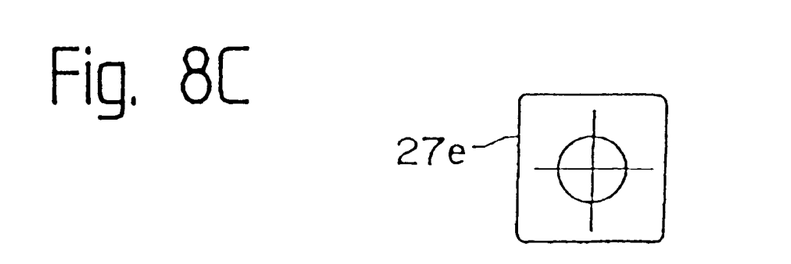

The cutters 27 comprise two cutting edges (first cutting element 27a, second cutting element 27b) respectively as shown in FIG. 6, FIGS. 7(A), (B) and FIGS. 8(A), (B). A cutting edge 27c of the first cutting element 27a of the one cutter arm 25 and a cutting edge 27c of the first cutting element 27a of the other cutter arm 25 have the same inclination so that they become parallel to each other in butt position. Cutting edges 27d, 27d of the second cutting elements 27b, to be lapped over the first cutting elements 27a have the same inclination as that of the cutting edges 27c of the first cutting elements 27a, but in reverse direction. Thus, the cutting edges 27c, 27d of the first and second cutting elements 27a, 27b present an obtuse V shape if seen from the front side. The first and second cutting elements 27a, 27b are thus fed in to cut the wire coating when closed in lapped position, according to wire outer diameter as shown in FIGS. 7(A), (B).

The cutting elements 27a, 27b of the cutters 27 are mounted to the cutter arm 25 with a spacer 27e (approx. 0.2 to 0.3 mm thick) inserted between them so as to prevent collision of the cutter edges 27c, 27d with each other when they pass each other. As a result of this, the V-forming cutting edges are apart from others so that interference of cutting edges with each other is prevented when the cutting edges of the upper and lower cutters 27 are fed in to engage while tracing a circular arc.

The knob 15a of the infeed adjusting mechanism 15 is provided on its peripheral face with graduations 58 in 5/100 mm. By turning the knob 15a, the positioning member 16 fitted on the peripheral screw of a shaft 15b of the knob 15a, moves forward or backward to adjust the position of its inner end (thrust bearing 17).

In FIG. 3, a sensor 59 is shown which is used for setting a starting position operated by the nut block 11 and a sensor 60 is shown for detecting completed stripping and giving a reversing command to the motor 7.

The effects of the working form are described in the following. The knob 15a of the infeed adjusting mechanism 15 is turned first in order to set infeed in accordance with the diameter of the wire to be handled referring to the graduations 58. Then, the coated wire W is put between the grippers 21 and held in position where the required stripping length of coating is ensured. A switch, not indicated in the figure, is turned on to start motor 7. The motor 7 operates in forward direction and the main spindle 3 rotates in the forward direction.

At the beginning of forward rotation of the main spindle 3, the nut block 11 is kept fixed by resistance of the brake unit 53 so that the main spindle 3 advances because of the coupling between its lead-screw shaft 10 and the nut block 11.

Figure 2C:
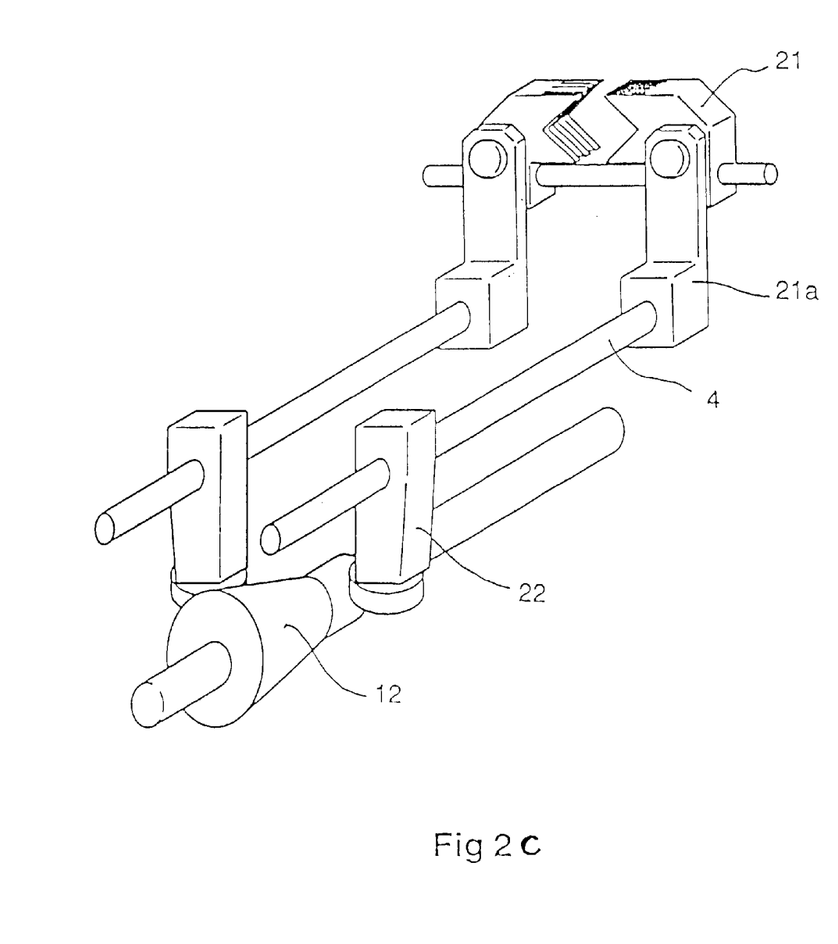
FIG. 2C is a detailed view of the grippers.

The first conical cam 12 then pushes the rollers 23 outward to oscillate the arms 22. The gripper shafts 4 fixed to the arms 22 rotate respectively to close grippers 21 on their tip to grip the coated wire (see FIG. 2C).

At the same time, the second conical cam 13 pushes the rollers 38 to oscillate the oscillating members 36 outward by using the shafts 35 as supporting point. Oscillation of the oscillating members 36 is transmitted via the roller 42, the lever 41, the shaft 40, the lever 43 and the roller 44 to push forward the third conical cam 30.

Forward movement of the third conical cam 30 pushes outward the rollers 28 of the cutter arms 25 which turn around the shafts 26 respectively to close the cutters 27 on the tip to cut the coating of the coated wire W up to a specified depth.

At this moment, the rear flange 45 of the cylindrical member 46 on the tip of the first conical cam 12 comes in contact with the rollers 49 of the lower lever 48 and pushes them so that the lower lever 48 turns around the shaft 47. This turning movement is transmitted via the shaft 47 to the upper lever 50 whose rollers 51 move the sliding cylinder 33 forward.

Because the lead-screw part 34 on the machine frame side is coupled with the female-screw part 33a, the sliding cylinder 33 rotates during its forward movement. The cutter shaft 5 connected to the sliding cylinder 33 by the spline shaft 32 rotates so that the cutters 27 turn while being fed in to the coated wire W to cut the coating uniformly over the entire periphery.

The pin 20 of the main spindle 3 advances further by the length of the slot 19 of the cylindrical part 18 after the cylindrical part 18 on the tip of the second conical cam 13 has come in contact with the inner end of the positioning member 16 and the second conical cam 13 has stopped. Forward movement corresponding to this stroke of the pin 20 serves as the rotation stroke for the sliding cylinder 33.

When the pin 20 has come in contact with the front end of the slot 19, the main spindle 3 is no longer able to advance. Then, the nut block 11 begins to move backward by lead screw on the rotating main spindle 3 to retract the cutter shaft 5 together with the coating having been cut by the cutters 27. The third conical cam 30 does not move backward at this moment because it is blocked at the rear end by the rollers 44 of the levers 43, so that the cutters 27 are held in nipping position and move backward to strip the cut coating away from the core.

When the nut block 11 has been detected by the sensor 60 for giving reversing command, the motor 7 operates in reverse direction to reverse the main spindle 3, which then returns first by lead screw on its lead-screw shaft 10. As a result of this, the grippers 21 having been kept in a closed position are opened by a procedure reverse to the above to release the coated wire W. As the second conical cam 13 moves backward, the oscillating members 36 return to a vertical position and the rollers 44 of the levers 43 return as well. Then, the lower cutter arm 25 lowers while oscillating on the cutter side and thus cutters 27 come apart from each other. The nut block 11 moves forward to the initial position (as shown in FIGS. 2 and 3) by the action of the lead-screw shaft 10. The sensor 59 detects this and stops the motor 7 to complete the process.

A non-reversible motor may also be used instead of a reversible motor if the main spindle rotation can be changed by means of a clutch. Notwithstanding the working form as described above where the cutter shaft 5 is rotated by the lead screw 34 through the interlocking mechanism in combination with the movement of the first conical cam 12, a motor may also be provided separately for rotating the cutter shaft 5 and may be set to operate at a specified moment to rotate the cutter shaft 5.

In another embodiment one of both cutting elements 27a and 27b is enabled to move forward and backward in a wire nipping direction. The cutting edge of the movable cutting element is flattened so as to ensure more positive centering by movement of the cutting element at wire nipping operation in accordance with wire diameter and infeed.

Figure 9:
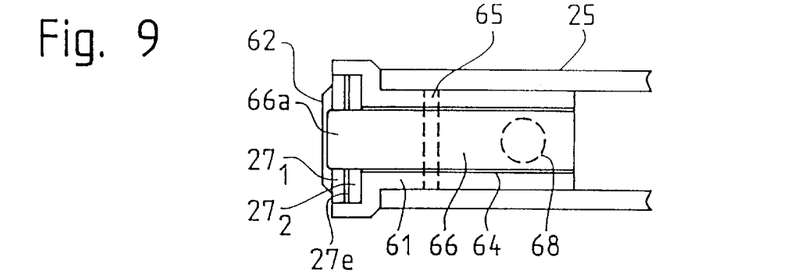
FIG. 9: is a top view of one embodiment of the cutter.
Figure 10A:
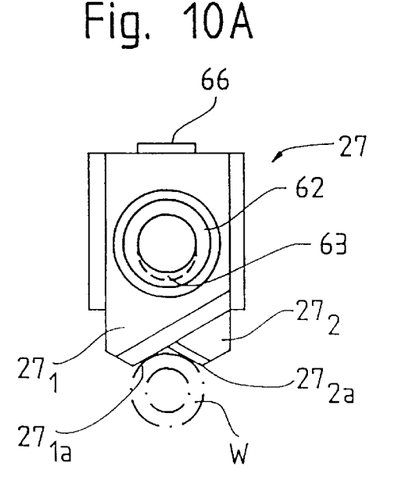
FIGS. 10A and 10B: show a front view of the cutter.
Figure 10B:
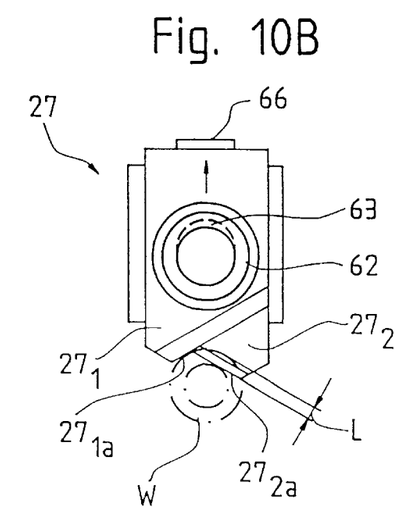
Figure 11A:
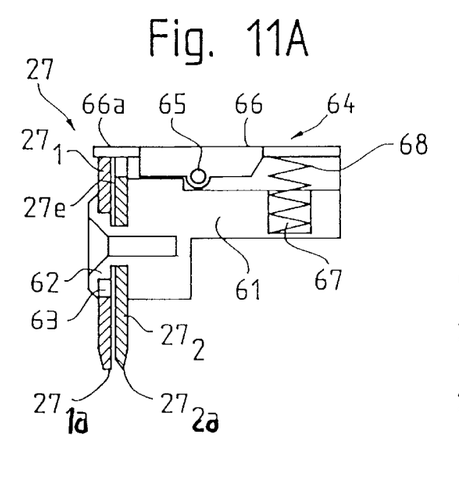
FIGS. 11A and 11B: show a cutter holder with a pusher plate.
Figure 11B:
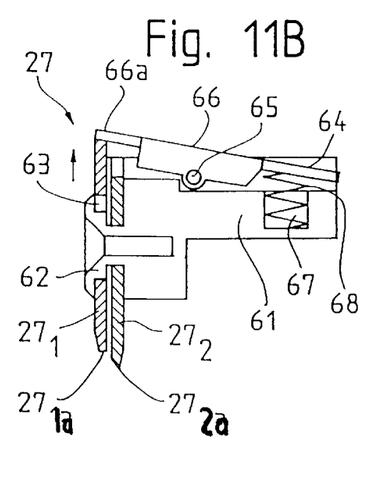

A concrete working form for this is shown in FIGS. 9 through 11 by taking one of the cutters 27 as a representative example. First and second cutting elements 271, 272 are attached, with the spacer 27e between them, to the front end of a cutter holder 61 on the tip of the cutter arm 25 by means of a lap screw 62. The cutting element on outer side of the two, namely cutting element 271, is made movable in the wire nipping direction through its mounting hole 63 formed as a slot extending in the wire nipping direction, and is provided with a flattened cutting edge 271a. The cutter holder 61 is provided on its back side with a pushing element 64 which pushes the said cutting element 271 at the end opposite to cutting edge 271a. In the illustrated example, a pusher plate 66 supported at its intermediate portion by a shaft 65 as shown in FIGS. 11(A), (B) is provided on the cutter holder 61. The front end 66a of the pusher plate 66 is in contact with the outer end of the cuffing element 271. The tip of a compression spring 68, approximately half of which is fitted in a supporting hole 67 formed in the cutter holder 61, is in contact with the opposite end of the pusher plate 66. The compression spring 68 pushes the rear end of the pusher plate 66 so that the front end 66a of the pusher plate 66 pushes the cutting element 271 into the direction of advance of the cutting edge 271a. Means for supplying the pushing force is not limited to the compression spring 68, but may be any other means that pushes the cutting element 271 in the direction of advance of the cutting edge, such as a wire spring, a leaf spring, etc. With the cutter structure, infeed is determined by the cutting edge 272a of the fixed cutting element 272a at the moment when the cuffing elements 271, 272 of both cutters nip the wire W while the cutting edge 271a of the movable cuffing element 271 comes in contact with the outer face of the wire W as shown in FIG. 10(A) and then retracts in accordance with infeed L as shown in FIG. 10(B) against the force given by the compression spring 68. Thus, the wire W regardless of its diameter is always brought to the center between the cutting edges of the cuffing elements 271, 272 by both cutters 27 so that the coating can be cut to a uniform depth over the entire periphery of the wire W by turning the cutters on the basis of ensured centering of the wire W. Notwithstanding the working form where the outer cutting element 271 is made movable, it is naturally possible to make the inner cuffing element 272 movable and to fix the outer cutting element 27.

The invention is not limited by the embodiments described above which are presented as examples only but can be modified in various ways within the scope of protection defined by the appended patent claims.

I claim:

1. A wire stripper for stripping a coating from a core at an end of a coated wire, the stripper comprising:
    a machine frame;
    gripper means mounted in the frame for gripping the coating;
    cutter means mounted in the frame for nipping and cutting the coating immediately behind the gripper means so as to cut the coating and strip it away from the core with the cutter means;
    a reversible main spindle supported in the machine frame so as to be slideable crosswise axially to enable the gripping of the gripper means as well as the nipping and cutting of the cutter means, the main spindle having a lead-screw shaft; and
    a nut block coupled with the lead-screw shaft so that the lead-screw shaft advances by forward rotation of the main spindle to close the gripper means and the cutter means, and so that the nut block is subsequently moved backward by the lead-screw shaft after the main spindle has stopped advancing, the cutter means is then withdrawn to strip the cut coating away from the core.

2. A wire stripper for stripping a coating from a wire core at an end of a coated wire, the stripper comprising:
    a machine frame;
    grippers mounted in the frame for gripping the coating of the coated wire at the end;
    cutters mounted in the frame for nipping and cutting the coating immediately behind the grippers so as to cut the coating and to strip it away from the core with the cutters;
    a reversible main spindle supported on the machine frame so as to be slideable crosswise axially to enable the gripping operation of the grippers and the nipping and cutting operation of the cutters, the main spindle having a lead-screw shaft;
    a nut block coupled with the lead-screw shaft;
    braking means for resisting rearward movement of the nut block;
    a first conical cam mounted on the main spindle;
    a pair of gripper shafts having ends, the gripper shafts being in operative connection with the first conical cam so that the first conical cam turns the gripper shafts;
    grippers mounted on the ends of the gripper shafts so that the grippers extend in opposite directions to one another at a predetermined angle so that the grippers selectively grip and release the coated wire;
    a second conical cam mounted on the main spindle so as to be movable forward and backward to adjust cutting depth;
    a cutter shaft mounted to the machine frame, the cutters including a pair of cutter arms having a central part pivotably supported on a front end of the cutter shaft; a third conical cam slideably mounted on the cutter shaft so as to engage a rear end of the cutter arms and pivot the cutter arms so that a front end of the cutter arms selectively engage and release the coated wire;
    a sliding cylinder connected to a rear end of the cutter shaft; interlocking means connected between the first conical cam and the sliding cylinder for moving the sliding cylinder forward as it is rotated by a screw on a rear side of the sliding cylinder; and
    a single reversible motor arranged in the machine frame and operatively connected to the main spindle so as to advance the lead screw shaft by forward rotation of the main spindle shaft and thereby close the grippers and cutters, and so as to move the nut block backwards with the lead screw after the main spindle has stopped advancing thereby withdrawing the cutters and stripping the coating from the core.

3. A wire stripper according to claim 2, wherein the interlocking means includes a cylindrical member substantially integrated to the said first conical cam and having front and rear ends provided with a flange, a lower lever having a tip on which a roller is mounted so as to be movable within a specified range between the flanges of the cylindrical member, and an upper lever having a tip on which a roller is mounted so as to fit in a peripheral groove in the sliding cylinder and turn while being interlocked with the lower lever, the cutter shaft being rotated by the screw as the sliding cylinder moves forward when the rear flange of the said cylindrical member pushes the roller of the lower lever to let the cutters cut the coating of wire while turning around it.

4. A wire stripper according to claim 2, and further comprising infeed adjusting means for determining a point where the front end of the second conical cam should come in contact and adjust infeed of the third conical cam so as to set a cutting depth of the cutters.

5. A wire stripper according to claim 2, wherein the cutter attached to the tip of each cutter arm includes first and second cutter elements whose cutting edges butt against mating edges respectively when the cutter arms are closed, the cutting edges of the first cutting elements and the cutting edges of the second cutting elements having an equal inclination so that they are parallel to each other respectively and form an obtuse V shape as seen from a front side, so that the first and the second cutter elements cut the coating when closed in lapped position, according to an outer diameter of the wire.

6. A wire stripper according to claim 5, wherein one of the first and the second cutting elements is attached to a cutter holder of the cutter arm so that the cutting element is movable in a wire nipping direction, the cutting edge of the one cutting element being flattened, and further comprising means for pushing the one cutting element into the wire nipping direction, the one cutting element being configured to retract against such a pushing force when the wire is nipped for positive centering of the wire.

7. A wire stripper for stripping a coating from a core at an end of a coated wire, the stripper comprising:
    a machine frame;

gripper means mounted in the frame for gripping the coating;

cutter means mounted in the frame for nipping and cutting the coating immediately behind the gripper means so as to cut the coating and strip it away from the core with the cutter means, the cutter means including a cutter shaft and a motor for driving the cutter shaft;

a reversible main spindle supported in the machine frame so as to be slideable crosswise axially to enable the gripping of the gripper means as well as the nipping and cutting of the cutter means, the main spindle having a lead-screw shaft; and a nut block coupled with the lead-screw shaft so that the lead-screw shaft advances by forward rotation of the main spindle to close the gripper means, and so that the nut block is subsequently moved backward by the lead-screw shaft after the main spindle has stopped advancing, the cutter means is then withdrawn to strip the cut coating away from the core.

* * * * *